United States Patent [19]

Nakano et al.

[11] Patent Number: 5,821,896
[45] Date of Patent: Oct. 13, 1998

[54] RADAR SYSTEM

[75] Inventors: Yosuke Nakano; Seishi Suganuma, both of Tokyo, Japan

[73] Assignee: Mitsubishi Denki Kabushiki Kaisha, Tokyo, Japan

[21] Appl. No.: 671,920

[22] Filed: Jun. 27, 1996

[30] Foreign Application Priority Data

Sep. 18, 1995 [JP] Japan .................................... 7-238443

[51] Int. Cl.$^6$ ................................................. G01S 13/00
[52] U.S. Cl. .......................... 342/90; 342/96; 342/109; 342/146; 342/169; 342/175
[58] Field of Search .............................. 342/90, 96, 109, 342/146, 169, 175

[56] References Cited

U.S. PATENT DOCUMENTS

| | | | |
|---|---|---|---|
| 4,527,161 | 7/1985 | Wehner | 342/90 |
| 4,972,193 | 11/1990 | Rice | 342/90 |
| 4,992,797 | 2/1991 | Gjessing et al. | 342/192 |
| 5,068,664 | 11/1991 | Appriou et al. | 342/90 |
| 5,392,050 | 2/1995 | Guerci et al. | 342/90 |
| 5,497,158 | 3/1996 | Schmid et al. | 342/90 |

FOREIGN PATENT DOCUMENTS

| | | |
|---|---|---|
| WO87/00930 | 2/1987 | Japan . |
| 5-27018 | 2/1993 | Japan ............................ G01S 13/04 |
| 6-174838 | 6/1994 | Japan ............................ G01S 13/89 |
| 6-174838 | 6/1996 | Japan ............................ G01S 13/89 |
| 2 229 027 | 9/1990 | United Kingdom ............. G06K 9/62 |
| 2229027 | 9/1990 | United Kingdom . |

OTHER PUBLICATIONS

Dutch Search Report from Dutch patent application No. 1004048.

Neural Networks for Adaptive Shape Tracking, McAulay et al., SPIE vol. 1099 Advance in Image Comp. and Auto. Target Recog., 1989, pp. 74–82.

Inverse Sar and its Application to Aircraft Classification; Dike et al., IEEE International Redar Conference, 1980pp. 161–167.

*Primary Examiner*—J. Woodrow Eldred
*Attorney, Agent, or Firm*—Wolf, Greenfield & Sacks, P.C.

[57] ABSTRACT

An image corresponding to an aspect angle computed from tracking data of a target is read out from an actual measurement data base as a reference image, is subjected to a relativity processing with the obtained image of the target in a relativity processor, and a result of the processing is displayed on a display unit.

4 Claims, 11 Drawing Sheets

| A | 0° ~ 20° | ENGINE, NOSE |
| B, D | 20° ~ 40°, 50° ~ 100° | ENGINE, NOSE, FUSELAGE |
| C | 40° ~ 50° | ENGINE, MAIN WING, NOSE, FUSELAGE |
| E | 100° ~ 170° | ENGINE, FUSELAGE |
| F | 170° ~ 180° | ENGINE |

RADAR SYSTEM

FIELD OF THE INVENTION

The present invention relates to a radar system for identifying a target with a radar image.

BACKGROUND OF THE INVENTION

Figure 14:
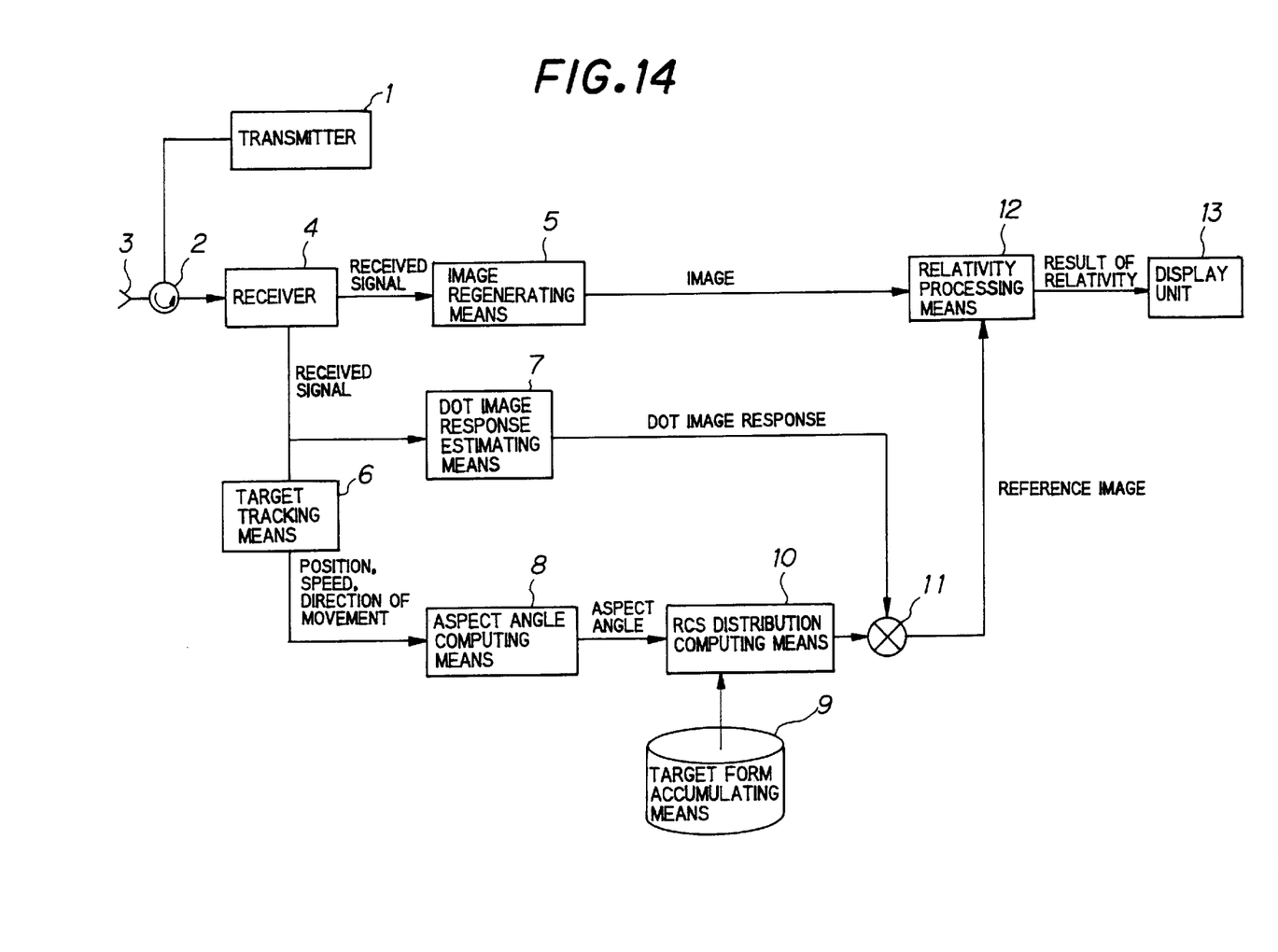
FIG. 14 is a block diagram showing a conventional type of radar system for identifying a target.

In recent years, research and development activities have been very active to develop an image radar which can obtain a high resolution image of a target and enables an operator to visually check a form of the target. Different from an infrared light sensor or other optical sensors, a radar can be used day and night regardless of any weather conditions, and also makes it possible to get an image of a target from a site far away from the target. With this radar, it becomes possible not only to detect, measure a distance from, and track a target, but also to identify the target. FIG. 14 is a view showing a radar system based on the conventional technology for identifying a target such as that disclosed, for instance, in Japanese Patent Laid-Open Publication No. 174838/1994. In this figure, designated at the reference numeral 1 is a transmitter, at 2 a switch for transmission/receiving, at 3 an antenna, at 4 a receiver, at 5 an image regenerating means for regenerating an image from a received signal, at 6 a target tracking means, at 7 a dot image response estimating means, at 8 a target aspect angle computing means, at 9 a target form accumulating means, at 10 an RCS distribution computing means, at 11 a folding integration means, at 12 a relativity processing means, and at 13 a radar image display means for displaying a regenerated image.

Next, a description is made for operations. A reflected signal from a target is received, and an image of the target is regenerated by the image regenerating means 5. Also with the target tracking means 6, data for a position, a moving direction, and a speed of the target are obtained, and an aspect angle of the target is obtained from a line of site of the radar, the position and the direction of movement of the target. Data for target forms accumulated in the target form accumulating means 9 is successively read out, and in the RCS distribution computing means an RCS distribution of the target is computed according to a method of theoretically computing an RCS distribution (such as GTD (Geometrical Theory of Diffraction), or PTD (Physical Theory of Diffraction)). Also a dot image response function is obtained from a received signal, folding integration for the computed RCS distribution and the dot image response function is executed, and then a reference image used for identifying a target is computed. Processing for checking relativity between reference images successively prepared and a radar image for an unknown target obtained by the radar is executed, and then the radar image of the unknown target, reference image, and a result of the relativity processing are shown on the display unit 13.

In the apparatus for identifying a target based on the conventional technology as described above, accumulated data for target forms is successively read out one by one, a radar candidate signatures (RCS) distribution for each form is theoretically computed to prepare a reference image, so that a disadvantageously long processing time has been required. When identifying a target, it is necessary to immediately determine what type the target is, or whether the target is an enemy's one or an ally's one for taking a necessary measure against it, and for this reason the processing time should be shortened as much as possible. Also when considering the possibility to mounting the radar system, the data capacity should be minimized for mounting the radar system on a limited space.

SUMMARY OF THE INVENTION

It is an object of the present invention to reduce a volume of computed data required for preparing a reference image.

Also it is an object of the present invention to reduce a volume of data for actual measurement values which are accumulated and used for preparing reference images.

It is another object of the present invention to reduce a volume of data to be processed by specifying a target from a position, a moving direction, a speed, and a size of the target and reading only the target suited to the result from the data base. It is an object of the present invention to improve the identifying performance by using data other than images.

Also it is still another object of the present invention to enable identification of a target, such as a fighter, any portion of which other than the engine section does not reflect an electric wave.

It is still further different object of the present invention to improve the identifying performance by obtaining a size of a target in the cross range direction.

In the radar system according to Embodiment 1 of the present invention, in order to reduce a volume of data to be computed in processing for preparing a reference image, a scale model of a target as an object to be identified or a radar image of the actual target is measured for each angle at which a specific section of the target causes specific reflection of an electric wave to the radar in stead of preparing a reference image by theoretically computing an RCS distribution from data for target forms, and an actual measurement value data base is provided for accumulating the result as reference images.

In the present invention, RCS is computed from a three-dimensional form model and a relativity processing is executed without executing a processing for preparing a reference image by accumulating radar images actually measured using a scale model or an actual target for an angle at which a characteristic portion of the target reflects an electric wave and using any of the radar images as a reference image for identifying a target. Also as it is extremely difficult to theoretically compute RCS taking into account multiplexed reflection from a concave section or the like and a surface roughness, a radar image obtained through actual measurement may be used as a reference image to identify a target by using a reference image more faithful to the actual radar image.

In the radar system according to Embodiment 2 of the present invention, there is provided an actual measurement value data base in which data for a scale model of a target to be identified or for a radar image of the actual target is accumulated in an angular range where reflection occurs from each of a plurality of specific constructions each constituting the target, and at angles each representing a combination of the specific constructions.

In the present invention, it is possible to have a data base for each target requiring a minimum data capacity respectively by having reference images in a least required angular range obtained from parameters of an actual radar system. In the radar system according to Embodiment 3 of the present invention, there are provided a target size computing means for computing a size of a target and a target RCS computing means for computing RCS of the target, and also a data selecting means for classifying the target according to a size, RCS, a position, and a speed of the target and selecting data to reduce a number of targets for which relativity processing is to be executed.

In the present invention, a target is classified according to a position, a speed, movement, a size and an RCS size of the target obtained by an image radar system. By executing relativity processing only to a reference image suited for the target, identification of a target can be executed within a substantially shorter period of time.

In the radar system according to Embodiment 4 of the present invention, there are provided a cylindrical form depth extracting means for extracting a depth of a cylindrical form from an opening of the cylindrical form as well as from reflection from the bottom section thereof, a cylindrical form depth data base for storing therein data for depth of various types of target cylindrical forms, and a relativity processing means for processing relativity between the two types of cylindrical forms. In the present invention, a depth of a cylindrical form is extracted from an opening of the cylindrical (concave) portion of a target image as well as from reflection from the bottom section thereof, and the relativity between the depth obtained described above and a depth of each type of target cylindrical forms accumulated is checked, thus identification of a target such as a fighter which reflects an electric wave only at a engine section thereof being enabled.

In the radar system according to Embodiment 5 of the present invention, there are provided a mono-pulse antenna for receiving a reflected signal from a target with two channels, namely a Σ channel and a Δ channel, a mono-pulse computing device for computing an angular error of each isolated reflection point of a target, and a coordinate value converter for converting a range vs cross range ratio of an obtained image to a distance vs distance ratio thereof from the distance vs frequency ratio.

In the present invention, a Σ signal and a Δ signal for each isolated reflection point on a target obtained from a monopulse antenna are subjected to mono-pulse computing, and an angular error for each isolated reflection point is computed. From this result, by converting a cross range direction expressed by a Doppler frequency to a target size, a size and a form of the target are faithfully processed into an image, which enables identification of a target with higher performance.

Other objects and features of this invention will become understood from the following description with reference to the accompanying drawings.

DESCRIPTION OF THE PREFERRED EMBODIMENTS

Figure 1:
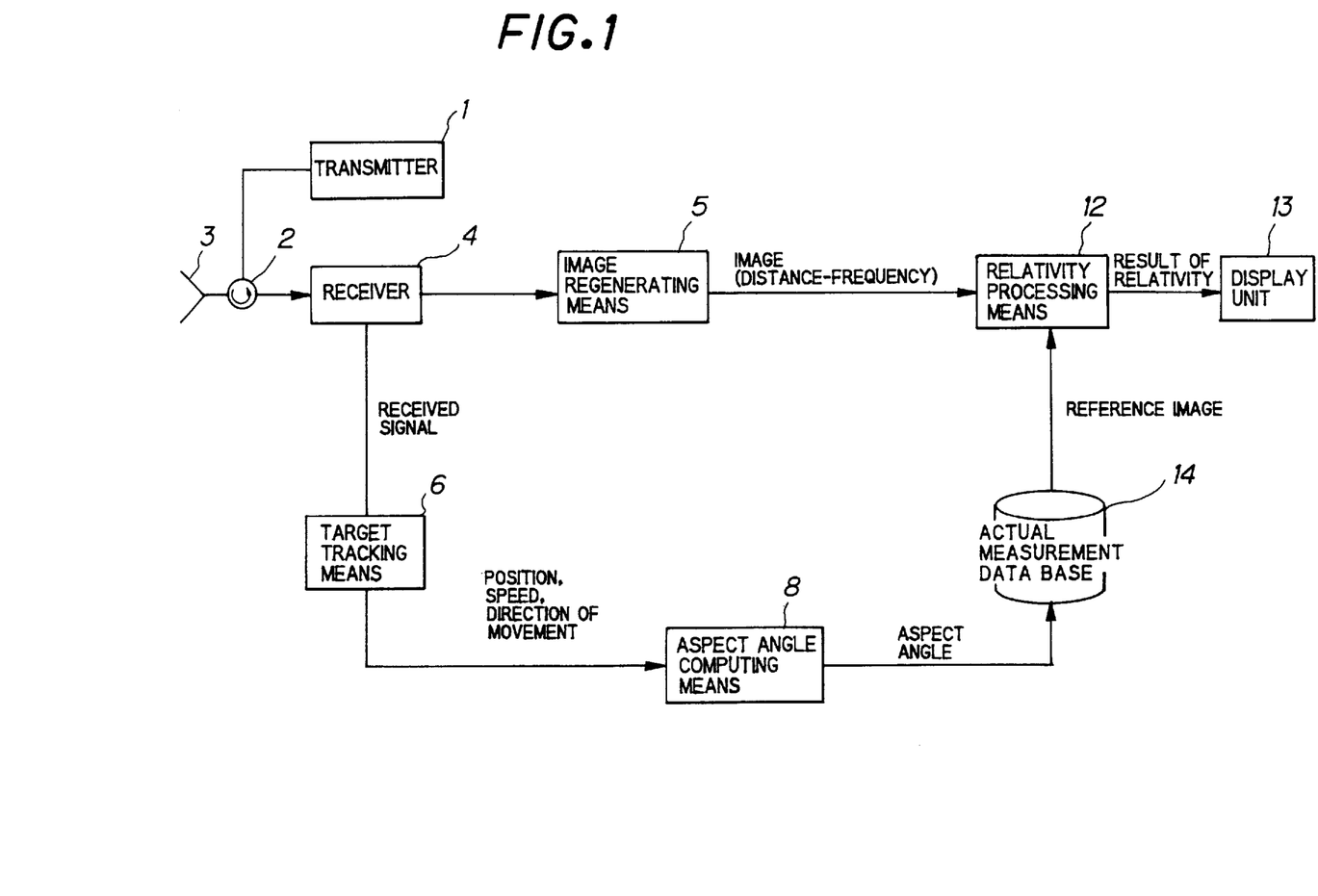
FIG. 1 is a block diagram showing Embodiments 1 and 2 of the present invention.

FIG. 1 is a view showing configuration of Embodiment 1 of the present invention, and in the figure, designated at the reference numeral 1 is a transmitter, at 2 a switch for transmitting and receiving, at 3 an antenna, at 4 a receiver, at 5 a target image regenerating means, at 6 a target tracking means, at 8 an aspect angle computing means, at 12 a relativity processing means, at 13 a display unit, and at 14 an actual measurement data base.

Next, a description is made for operations. As shown in FIG. 1, when a signal from a target is obtained, a radar image of the target is prepared by the image regenerating means 5. Also a position, speed, and a direction of movement of a target are obtained by the target tracking means 6 according to a received signal, and the result of that is sent to the aspect angle computing means 8. In the aspect angle computing means 8, an aspect angle of a target is computed from a line of site of a radar as well as from a position and a direction of movement of the target. A radar image at a computed aspect angle is read out as a reference image from the actual measurement data base 14 in which radar images of target to be identified measured using the scale models or images actual targets are previously stored. With this feature, it is not required to theoretically compute a reference image from the target form for identification, so that a period of time required for processing can be reduced. However, a capacity of data to be stored therein may become larger. And for this reason, actual measurement data to be stored should be obtained for each angle at which reflection from a specific portion of the target construction occurs. The angle can be decided from the angular characteristics of reflection from the specific portions of the target construction (e.g. in a aircraft, a type, engines, a fuselage, and wings thereof). As described above, a reference image is successively read out from the actual measurement data base in which images of specific portions of expected targets are stored for each angle, and subjected to preprocessing such as CFAR to extract a portion specific to the target object, and then subjected to the relativity processing by means of a method such as ten-plate matching or construction matching, and a result of the processing is displayed on the display unit 13.

Figure 2:
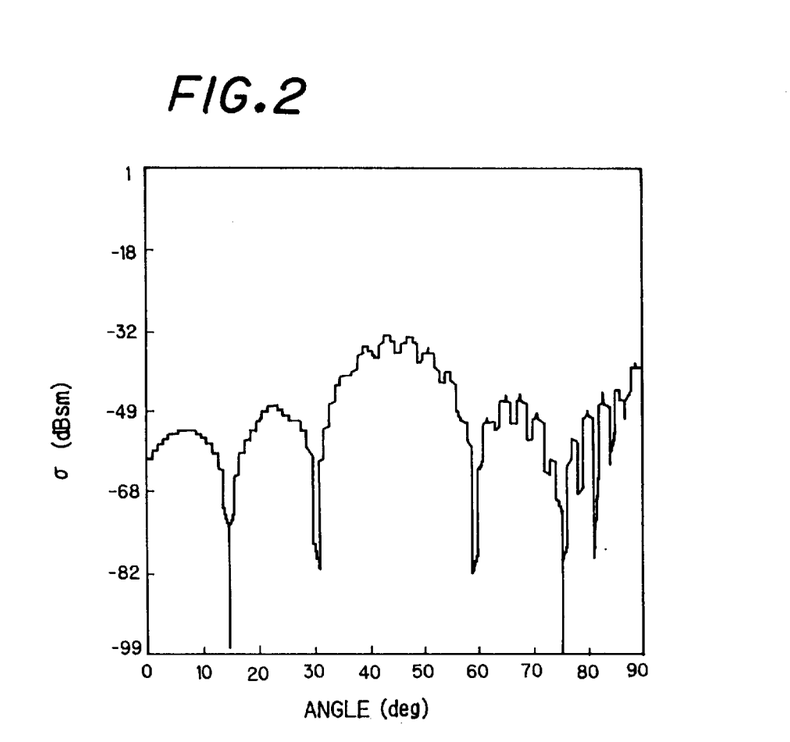
FIG. 2 is a view obtained by theoretically computing angular characteristics of an RCS for a main wing in the one-seventieth-B747 at a frequency of 30 GHz.

In FIG. 1, as a method of obtaining a specific angular range, wings of a aircraft can be taken up as an example. FIG. 2 shows a result of the angular characteristics of an RCS of a main wing in the one-seventieth scale B747 obtained in PTD. The result is obtained by computing the RCS at a frequency of 30 GHz and a resolution of 1.7 cm, and indicates a value of one pixel of the main wing. It is understood from the figure that the angular range in which the RCS becomes −45 dBsm or more is in a range from around 30° To 60°. Herein, a target RCS in a minimum S/N which can be detected is obtained from the following expression based on an expression for computing a detecting distance for a radar. Expression 1

$$\sigma = \frac{(4\pi)^3 \, (KT_0) \, (NF) \left( \frac{1:2}{\tau} \right) \dfrac{\left( \frac{S0}{N0} \right)_1}{n} L_{sys} \cdot R^4}{P \cdot G^2 \cdot \lambda^2}$$

Figure 3A:
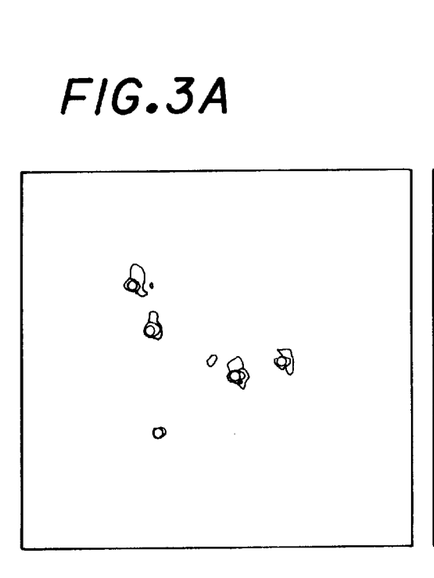
FIGS. 3A and 3B are images obtained by actually measuring the one-seventieth scale model of B747 at a frequency of 30 GHz and at angles of 28° and 32°.
Figure 3B:
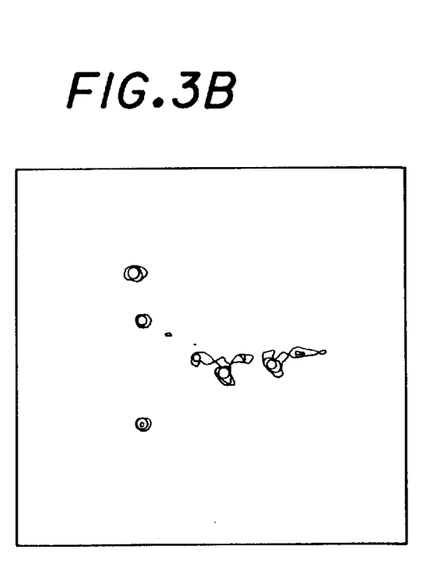
Figure 4:
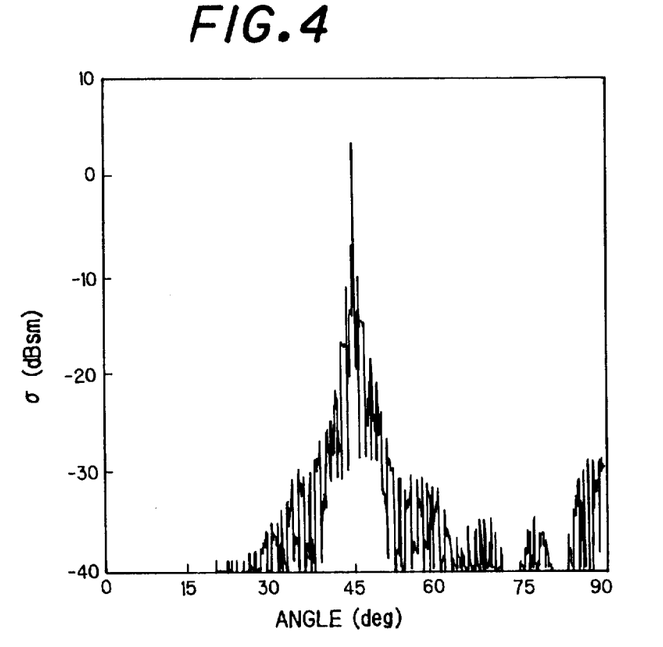
FIG. 4 is a view obtained by theoretically computing angular characteristics of an RCS for a main wing of the actual size of B747 at a frequency of 10 GHz.
Figure 5:
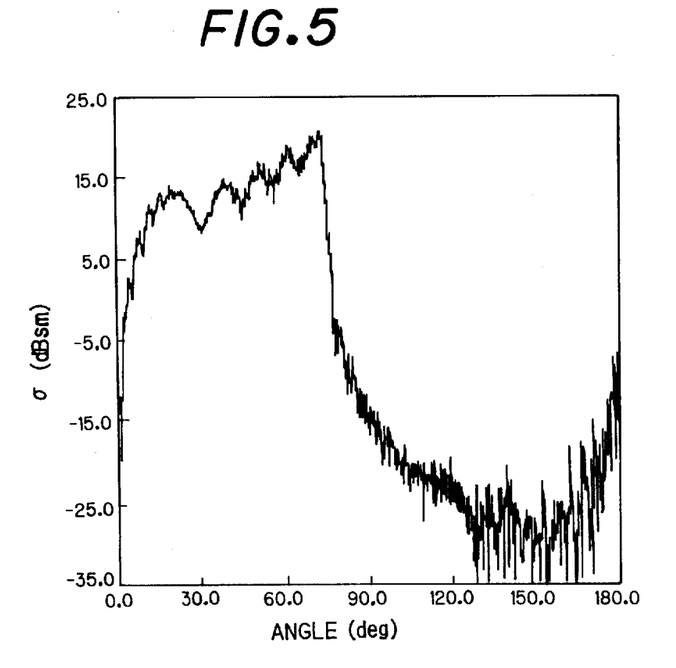
FIG. 5 is a view obtained by theoretically computing angular characteristics of an RCS for a nose of the actual size of B747 at a frequency of 10 GHz.
Figure 6:
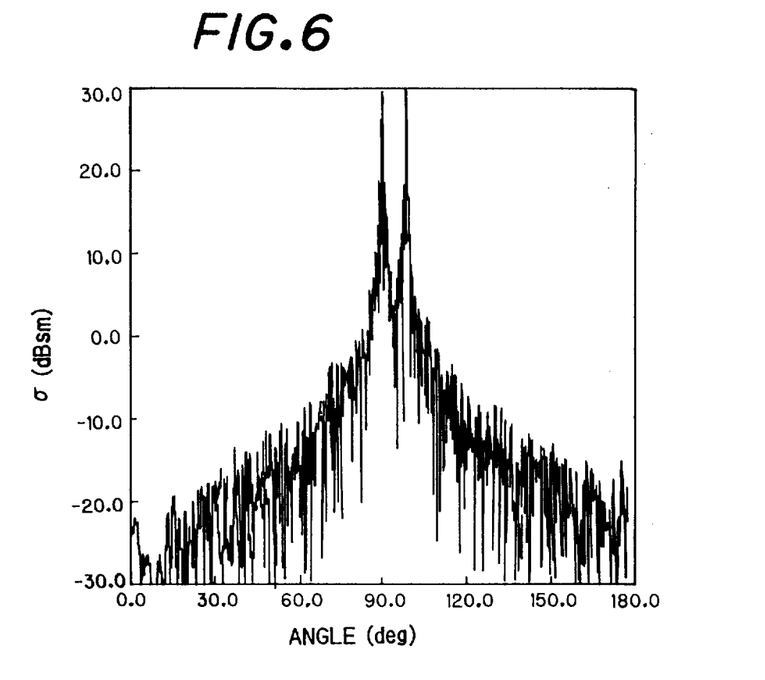
FIG. 6 is a view obtained by theoretically computing angular characteristics of an RCS for a fuselage of the actual size of B747 at a frequency of 10 GHz.
Figure 7:
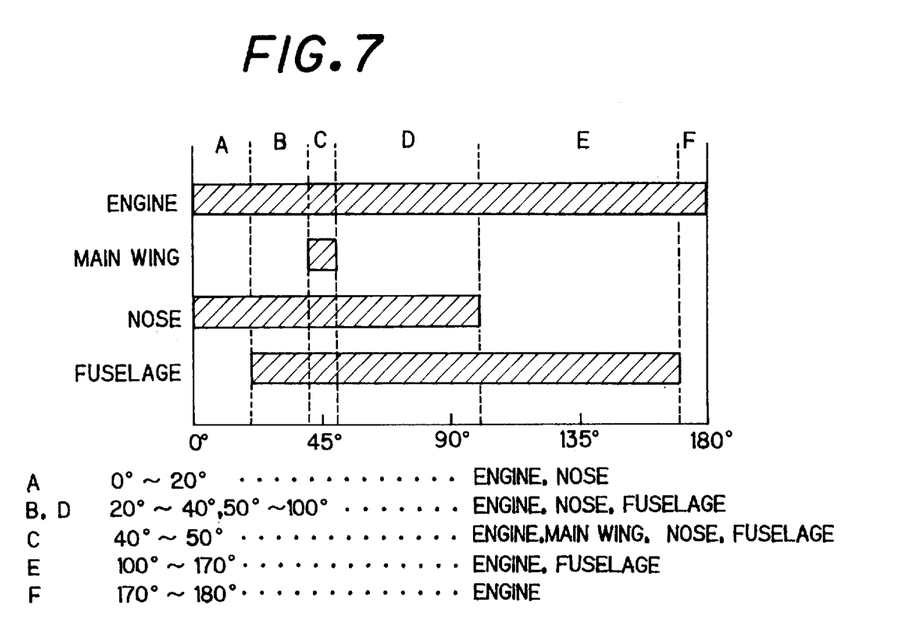
FIG. 7 is a view showing an angular range where reflection occurs from an RCS of portions specific to B747 at a frequency of 10 GHz.

$\sigma$: target RCS
$K$: Boltzmann' constant
$T$: temperature (K.)
$NF$: noise index
$\tau$: pulse width
$n$: integral (a ratio of a pulse pressure, FET)
$L_{sys}$: system loss
$R$: distance to a target
$\lambda$: wave length
$P$: transmission peak power
$G$: antenna gain $\left( \dfrac{S0}{N0} \right)_1$ : S N ratio per 1 pulse It is possible to know a range of an angle in which a certain portion can be seen as an image by setting the RCS as a threshold value. Namely images in a range exceeding the threshold value each having the RCS angular characteristics specific to target constructions are accumulated as a reference image. A radar image was actually obtained by using a scale model to examine feasibility of the method described above. FIGS. 3A and 3B show a result of actual measurement of the one-seventieth scale model of B747 at a frequency of 30 GHz and at a resolution of 1.7 cm. A threshold value of −45 dBsm was used herein. FIG. 3A shows an image at an angle of 28° and FIG. 3B shows an image at an angle of 32°. It is understood from the figures that the main wings can be imaged with a border at 30°. It can be determined from the result of the fact described above that the method is quite feasible. According to a result in Embodiment 1 described above an angle corresponding to measurement data available as a reference image is obtained in the image radar device of X band. Assuming that a frequency is set to 10 GHz, a transmission power: 50 kW, an antenna gain: 38 dB, a pulse pressure ratio: 1024, an FFT: 1024 points, an NF: 5 dB, a resolution: 1.5 m, an air attenuation factor: 2 dB, a system loss: 10 dB, and also assuming that a target distance is set to 50 NM and a minimum detecting SIN is 5 dB, the minimum RCS becomes −23 dBsm. FIG. 4 to FIG. 6 show a result of theoretical computing of the RCS angular characteristics of each specific portions in B747. FIG. 4 is obtained by theoretical computing of RCS of the main wing form. It is understood from FIG. 4 that the main wing can be imaged in an angular range from around 40° to 50°. Similarly, FIG. 5 shows a nose shown as an image in an angular range from around −100° to +100. FIG. 6 shows a fuselage shown as an image in an angular range from around 20° to 170°. These results show a case where the target is observed in the horizontal direction, but it is considered that one pattern is sufficient for an elevation direction assuming that a target which is linearly moving is observed at a distance therefrom. Also generally, an aircraft has a symmetrical form, so that an angular range from 0° to 180° is targeted herein. FIG. 7 shows the comprehensive result thereof (An engine which is the most important part of an aircraft is imaged in an angular range of 360° in a case of B747). With this feature, in a case of B747, data for reference images may be obtained for at least each angle in the angular range in FIG. 7 (as an example, 0°, 45°, 90°, 135°, 180°). As described above, data for anticipated target constructions is collected in an angular range in which reflection from specific constructions each constituting each of the targets at angles each representing a combination of specific construction causing specific reflection, said data accumulated in the data base 14 and used as reference images. Features of Embodiment 2 other than the actual measurement data base 14 are the same as those in Embodiment 1.

Figure 8:
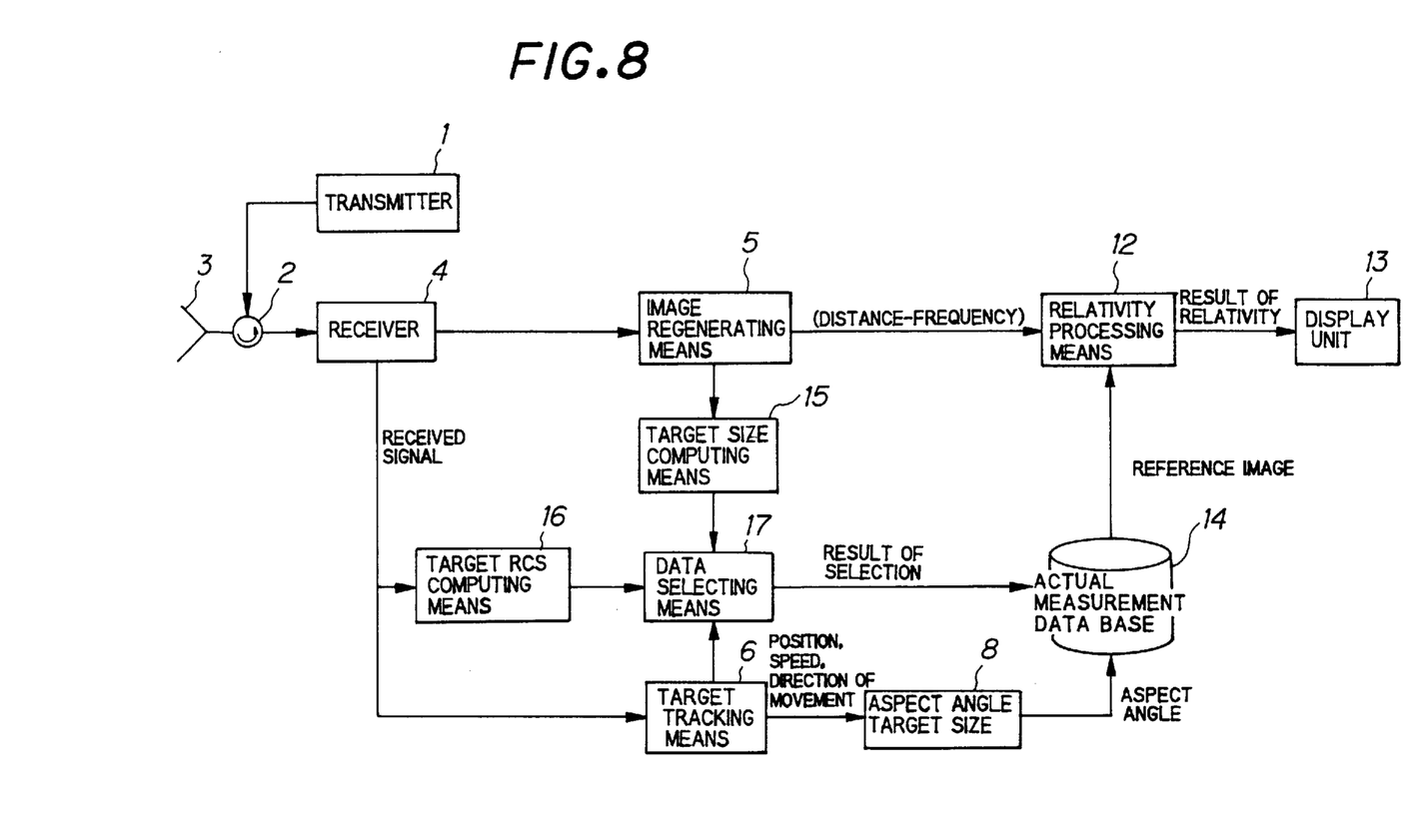
FIG. 8 is a block diagram showing Embodiment 3 of the present invention.

As shown in FIG. 8, an image for a target is regenerated from a received signal by the image regenerating means, and in the target size computing means 15, a size of the target is computed from a direction of a range obtained from an image and a direction of movement of a target obtained from the tracking data. And then a speed of movement of the target is obtained from a speed of the target toward the radar (a radial speed) and a direction of movement of the target. RCS of the target is computed through Expression 1 in the target RCS computing means 16, and a corresponding target is selected according to data for a size, RCS, a position, and speed of the target by the data selecting means 17. The data for selecting a target is shown in the table below.

| CLASSIFICATION | INFORMATION | | | |
| --- | --- | --- | --- | --- |
| | SIZE | RCS | POSITION | SPEED |
| LARGE AIRCRAFT | LARGE | MEDIUM | IN AIR | QUICK |
| SMALL AIRCRAFT | SMALL | SMALL | IN AIR | QUICK |
| LARGE MARINE VESSEL | LARGE | LARGE | AT SEA | SLOW |
| SMALL MARINE VESSEL | SMALL | SMALL | AT SEA | SLOW |
| VEHICLE | SMALL | SMALL | ON THE GROUND | MEDIUM |
| ROTARY-WING AIRCRAFT | SMALL | SMALL | IN AIR | MEDIUM |

A reference image of a target corresponding to the result of selection is sent from the actual measurement data base 14 to the relativity processing means 12. Images for a target obtained by the radar and reference images are successively subjected to a relativity processing in the relativity processing means 12, and a result of the processing is displayed on the display unit 13.

Figure 9:
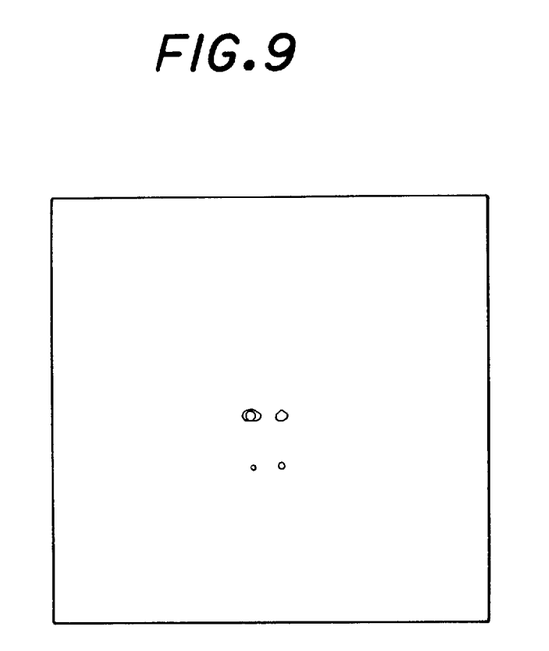
FIG. 9 is a radar image of a scale model for a fighter which was actually measured.
Figure 10:
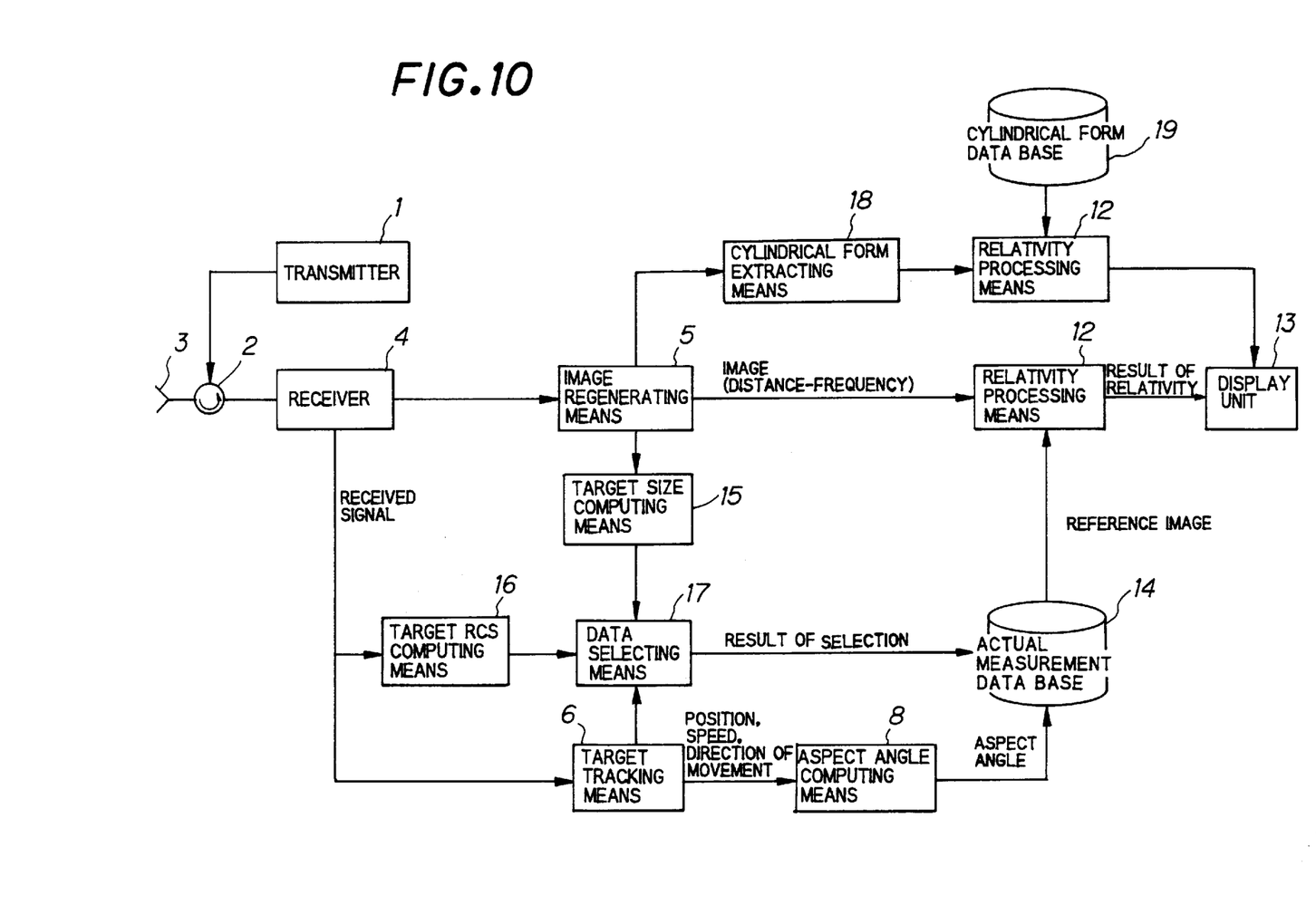
FIG. 10 is a block diagram showing Embodiment 4 of the present invention.

From the radar image of a scale model for a fighter actually measured and shown in FIG. 9, it is understood that identification thereof is quite difficult because no reflection can be obtained from any parts of the fighter other than the engine section. Reflection occurs, however, in an edge of an air suction port for the engine and an engine blade. A form of an engine varies for each type of fighters and a depth of the engine can be known from a gap between the two sections, so that identification can be executed by using data for the depth of each engine. In Embodiment 4 shown in FIG. 10, a method of identification according to a depth of a cylindrical form is added to the configuration of each of Embodiments 1 to 3. In a case where a result of classification indicates a fighter, a depth of the engine is extracted from the radar image of a target by a cylindrical form extracting means 18. The depth of engine extracted from the target image and the depth of engine of each type of fighters stored in a cylindrical form data base 19 are subjected to a relativity processing by the relativity processing means 12, and the result thereof is outputted.

Figure 11:
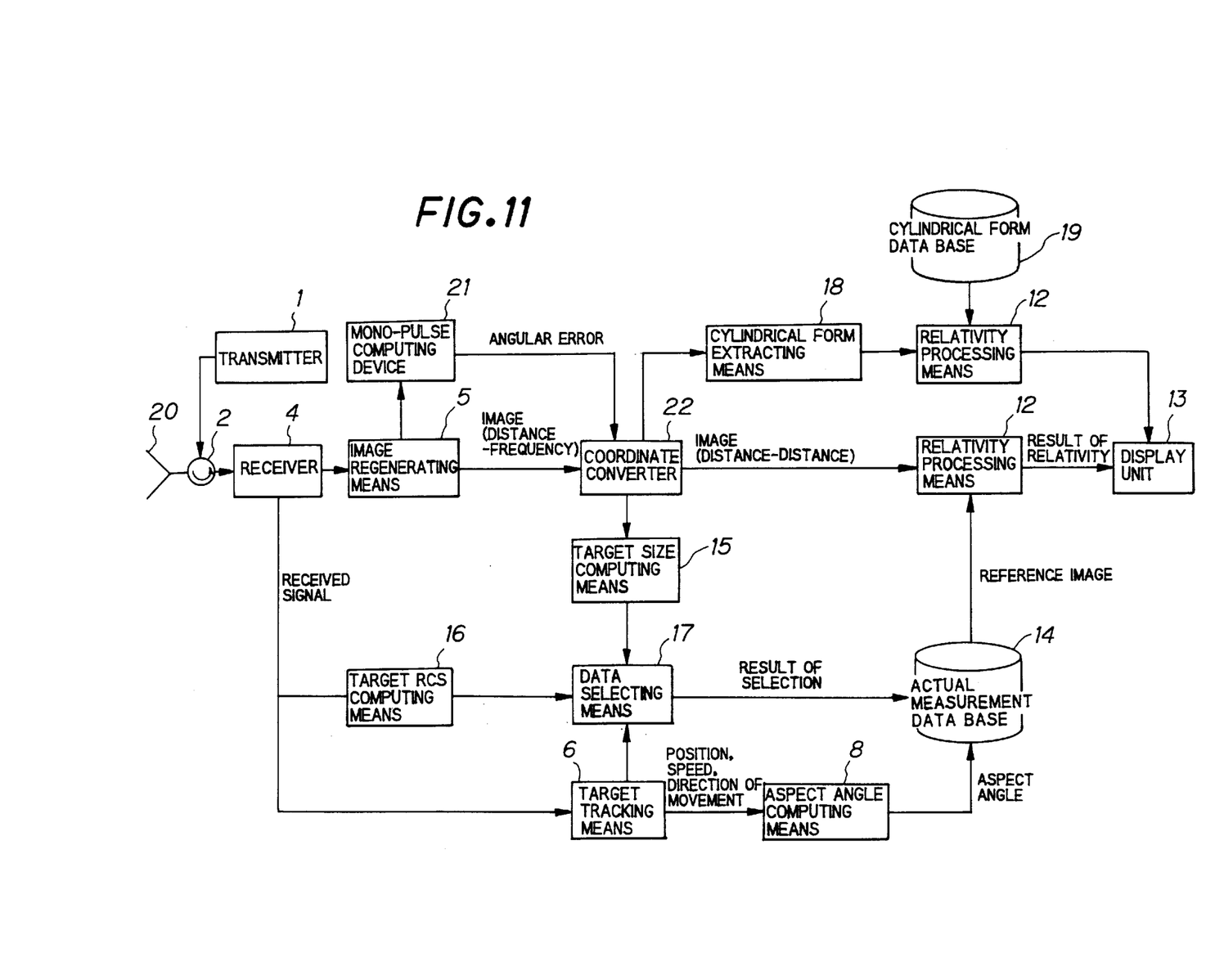
FIG. 11 is a block diagram showing Embodiment 5 of the present invention.
Figure 12:
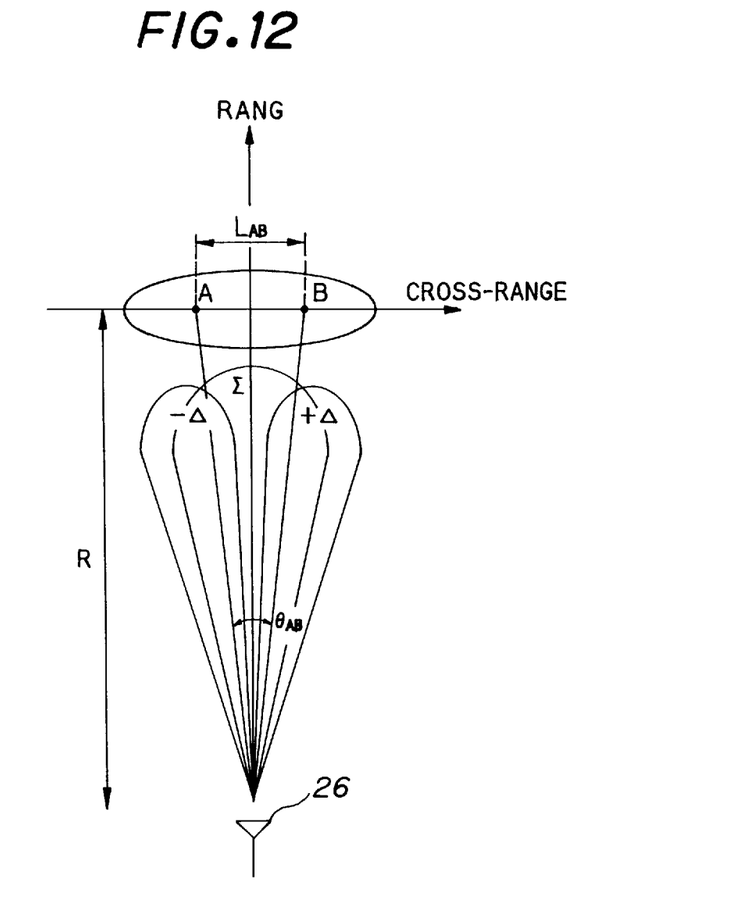
FIG. 12 is a view showing a relation between a mono-pulse antenna and an insulated reflection point of a target.
Figure 13:
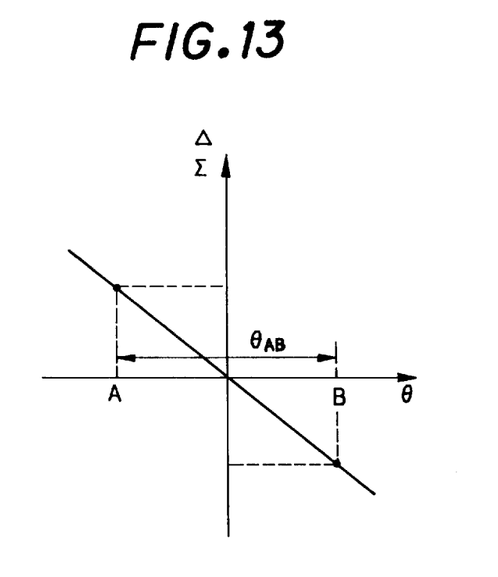
FIG. 13 is a view showing computation of an angular error.

FIG. 11 shows a block diagram of Embodiment 5. A sum signal (Σ) and a difference signal (Δ) between two isolated reflection points (A and B) of a target are obtained by using a mono-pulse antenna 20 as shown in FIG. 12. An angular error for each of the isolated reflection points is computed from the obtained Σ and Δ signals by a mono-pulse computing device 21 (FIG. 13). A distance of a cross-range between A and B can be computed from the angular error through the following expression.

$$L_{AB} = \theta_{AB} \cdot R \qquad \text{Expression 2}$$

$L_{AB}$: a distance of a cross-range between A and B
$\theta_{AB}$: an angle between A and B A target rotates about a position where a Doppler frequency is zero, so that the following expression can be used:

$$\Delta r \propto \Delta f_d \qquad \text{Expression 3}$$

$\Delta f_d$: a difference of a Doppler frequency between two points
$\Delta r$: a distance of a cross-range between two points.

With this feature, assuming that a certain point is set to a reference, a distance Δr of a cross-range from the point is expressed by the following expression: Expression 4

$$\Delta r = \frac{CR_{AB}}{f_{dAB}} \Delta f$$

$f_{dAB}$: a difference of a Doppler frequency between A and B

As described above, coordinates of a cross-range for an image is converted from a frequency to a distance in a coordinate converter 22 and a relativity processing is executed according to the image.

As described above, with Embodiment 1 of the present invention, a processing of theoretically computing a reference image can be omitted by using an actual measurement data base. Furthermore, an actual radar image is used as a reference image, so that an accurate image can be obtained regardless of multi-reflection from a concave form or an effect due to a rough surface, each of which cases is difficult to be treated in the method of theoretically computing an RCS.

With Embodiment 2 of the present invention, an angular range in which reflection occurs from specific constructions each constituting a target is computed from radar parameters, and angles, at which reference images are to be kept, are obtained from the combinations described above, which makes it possible to minimize a required capacity of a data base.

With Embodiment 3 of the present invention, a target is selected by using data for RCS, a size, a position, and a speed of a target, and only the target corresponding to the result of selection is subjected to a relativity processing, which makes it possible to reduce a quantity of data to be computed and increase the processing speed. Also identification capability can be improved by using data other than images.

With Embodiment 4 of the present invention, in a case where a target is a fighter, although it is difficult to identify the target because no image can be obtained but that of an engine, it is possible to identify a target such as fighters having the same number of engines which are difficult to be identified from each other by extracting a depth of each engine from reflection from an opening of the engine as well as from a blade surface and by using an identifying means according to an engine depth.

With Embodiment 5 of the present invention, an image of a target can be converted from a distance vs a frequency ratio to a distance vs a distance ratio according to an angular error between isolated reflection points of a target computed by using a mono-pulse. With this configuration, not only a size of a target of a range but also a size of the target in the cross-range direction can be obtained, which makes it possible to obtain the accurate target size and to improve the capability of identifying a target.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A radar system comprising:

an image regenerating means for regenerating an obtained radar image for an unknown target from a received signal;

a target tracking means for measuring a position, a direction of movement, and a speed of the unknown target from a received signal;

a target aspect angle computing means for computing an aspect angle of the unknown target from a direction of movement of the unknown target;

an actual measurement data base storing radar image data, the radar image data being data of at least one of a scale model of at least one target object and an actual radar image for the target object for each angle of reflection, the radar image data being generated by a construction specific to the target object;

a relativity processing means for reading out a radar image from the actual measurement data base corresponding to the aspect angle computed by said target aspect angle computing means and a selected one of the at least one target object, and for computing a degree of coincidence with the obtained radar image of the unknown target;

a display unit for displaying an image of the unknown target, the radar image read-out of the actual measurement data base, and the degree of coincidence from the relativity processing means;

a cylindrical form depth extractor for extracting a depth of cylindrical form from reflection from an opening as well as a bottom of a cylindrical form (a concave form) in an image of the unknown target regenerated from a received signal;

a cylindrical form data base for storing, when each target for identification has a cylindrical form, data for a depth of the cylindrical form; and a relativity processing means for computing a degree of coincidence between a depth of a cylindrical form obtained from an image of the unknown target and a depth of a cylindrical form of a target obtained in the data base.

2. A radar system comprising:

an image regenerating means for regenerating an obtained radar image for an unknown target from a received signal;

a target tracking means for measuring a position, a direction of movement, and a speed of the unknown target from a received signal;

a target aspect angle computing means for computing an aspect angle of the unknown target from a direction of movement of the unknown target;

an actual measurement data base storing radar image data, the radar image data being data of at least one of a scale model of at least one target object and an actual radar image for the target object for each angle of reflection, the radar image data being generated by a construction specific to the target object;

a relativity processing means for reading out a radar image from the actual measurement data base corresponding to the aspect angle computed by said target aspect angle computing means and a selected one of the at least one target object, and for computing a degree of coincidence with the obtained radar image of the unknown target;

a display unit for displaying an image of the unknown target, the radar image read-out of the actual measurement data base, and the degree of coincidence from the relativity processing means;

a mono-pulse antenna for receiving a $\Sigma$ signal and a $\Delta$ signal for an isolated reflection point, which is a remarkably specific point indicating reflection from a target to show a cross-range direction of a target image obtained by an image radar not with a Doppler frequency, but with a size of the target;

a mono-pulse computing means for computing an angular error for an isolated reflection point for a received $\Sigma$ signal and a received $\Delta$ signal; and a coordinate converter for converting coordinates of a cross-range direction expressed by a Doppler frequency to a size.

3. A radar system comprising:

an image regenerating means for regenerating an obtained radar image for an unknown target from a received signal;

a target tracking means for measuring a position, a direction of movement, and a speed of the unknown target from a received signal;

a target aspect angle computing means for an aspect angle of the unknown target from a direction of movement of the target as well as a line of sight of the radar;

an actual measurement data base storing radar image data, the radar image data being data of at least one of a scale model of at least one target object and a radar image of an actual target object in an angular range where reflection occurs from a plurality of specific constructions each constituting the target object with angle data each representing a reflection from any of the constructions;

a relativity processing means for reading out a radar image from the actual measurement data base corresponding to the target aspect angle estimated by said target aspect angle computing means;

a display unit for displaying the obtained radar image of the unknown target, the radar image read out form the actual measurement data base, and a result of a coincidence degree between patterns;

a cylindrical form depth extractor for extracting a depth of a cylindrical form from reflection from an opening as well as a bottom of a cylindrical form (a concave form) in an image of the unknown target regenerated from a received signal;

a cylindrical form data base for storing, when each target for identification has a cylindrical form, data for a depth of the cylindrical form; and a relativity processing means for computing a degree of coincidence between a depth of a cylindrical form obtained from an image of the unknown target and a depth of a cylindrical form of a target obtained in the data base.

4. A radar system comprising:

an image regenerating means for regenerating an obtained radar image for an unknown target from a received signal;

a target tracking means for measuring a position, a direction of movement, and a speed of the unknown target from a received signal;

a target aspect angle computing means for an aspect angle of the unknown target from a direction of movement of the target as well as a line of sight of the radar;

an actual measurement data base storing radar image data, the radar image data being data of at least one of a scale model of at least one target object and a radar image of an actual target object in an angular range where reflection occurs from a plurality of specific constructions each constituting the target object with angle data each representing a reflection from any of the constructions;

a relativity processing means for reading out a radar image from the actual measurement data base corresponding to the target aspect angle estimated by said target aspect angle computing means;

a display unit for displaying the obtained radar image of the unknown target, the radar image read out form the actual measurement data base, and a result of a coincidence degree between patterns;

a mono-pulse antenna for receiving a $\Sigma$ signal and a $\Delta$ signal for an isolated reflection point, which is a remarkably specific point indicating reflection from a target to show a cross-range direction of a target image obtained by an image radar not with a Doppler frequency, but with a size of the target;

a mono-pulse computing means for computing an angular error for an isolated reflection point for a received $\Sigma$ signal and a received $\Delta$ signal; and a coordinate converter for converting coordinates of a cross-range direction expressed by a Doppler frequency to a size.

* * * * *